3,067,086
PULPING PROCESS
Jack W. Wilson and Desmond O'Meara, Prince Rupert, British Columbia, Canada, assignors to Columbia Cellulose Company Ltd., Prince Rupert, British Columbia, Canada, a company of Canada
No Drawing. Filed Sept. 15, 1959, Ser. No. 840,011
9 Claims. (Cl. 162—83)

This invention relates to an improved method for the manufacture of wood pulp.

In the sulfite-type processes for producing wood pulp, cleaned wood in divided form, e.g. chips or wafers, or subdivided chips, is heated in an aqueous liquor containing one or more dissolved inorganic bisulfite or sulfite salts, e.g. sodium, calcium, magnesium or ammonium bisulfites or sulfites. The stoichiometric amount of sulfur dioxide necessary to form the simple sulfites (as distinguished from bisulfites) is considered to be present in the liquor in "combined" form. Any additional sulfur dioxide present in the liquor including that necessary to form bisulfites from sulfites and that in the form of sulfurous acid is considered to be in "free" form. The amount of sulfur dioxide in all forms is considered to be the "total" $SO_2$ and is the sum of the free and combined $SO_2$. In many conventional sulfite processes there is a large excess of free sulfur dioxide mostly in the form of sulfurous acid in the liquor. This is used to obtain more rapid cooking of the pulp, and is further necessary with calcium base liquors to keep calcium in solution.

In carrying out a sulfite-type process, the temperature and pressure of the wood-liquor mixture are gradually raised over a prescribed period until maximum values of about 130 to 200° C. and 70 to 150 p.s.i.g. are reached. The pulp treatment is usually considered to be made up of two parts, the impregnation or penetration period during which time the mass is heated up to lower than maximum temperature, usually under pressure, and the major part of the penetration of liquor into the interstices of the wood takes place, and the cooking period during which time the mass is heated to and kept at the maximum temperature. Accompanying these two periods are lignin sulfonation, and lignin solution plus carbohydrate decomposition. It should be noted, however, that there is no sharp dividing line between these two periods. After the cook is concluded, the mass is discharged, e.g. into a blow pit, and the pulp separated from most of the liquor. The pulp is then further treated depending on its intended end use. The heating steps of the process are usually carried out by means of steam which is contacted with the mass directly, or alternatively, heating is done indirectly by use of heat exchangers.

It is an object of this invention to provide an improved process for the production of wood pulp. It is a further object of this invention to provide a process of pulping wood whereby certain specific improvements in the process and product are obtained, e.g. improved quality and quantity of pulp, shorter process time and improved economy in the reuse of the discharged liquor in the process. Further objects will become apparent from the following detailed description of the invention.

In accordance with this invention, divided wood is contacted with liquor containing an inorganic bisulfite in which the combined sulfur dioxide content is at least 3.5%, the pH is no greater than 4.5, and the ratio of total to combined sulfur is in the ratio of between 1.8 and 2.8 to 1. While the process can be operated with as much as 10% combined sulfur dioxide, up to 5.5% combined sulfur dioxide is sufficient for most purposes. Preferably there is little or no sulfur dioxide present in the liquor as sulfurous acid or as the gas. After the wood is fully impregnated, the free liquor is separated from the wood, e.g. by draining or blowing such liquor from the digester so that there is substantially no liquor in the spaces between the wood pieces. The wood is then raised to and maintained at cooking temperature essentially in the absence of free liquor for a time sufficient to complete the cook. Thus the cook is completed in the vapor phase.

The process of this invention is preferably carried out with magnesium bisulfite as the main ingredient in the cooking liquor. For more efficient pulping, the wood chips may be steam treated prior to being contacted with the cooking liquor. After steaming the wood material is preferably contacted with cooking liquor at a relatively high pressure e.g. 90–100 p.s.i.g. but at a temperature considerably below the maximum cooking temperature e.g. 80–95° C. for a period of time to effect adequate impregnation; the pressure in the digester may then be relieved to atmospheric, the free liquor blown or drained from the digester and the temperature of wood raised to and maintained at a level and for a period of time necessary for complete cooking. Direct contact with steam may be suitably employed for the latter step. The pulp and residual liquor is then removed from the digester and the pulp is further treated in accordance with its end use. The liquor which is removed from the digester prior to the vapor phase cooking step may be reused in the process after suitable fortification or evaporation. The residual liquor accompanying the pulp at the end of the cook may be separated and burned after suitable evaporation.

It has been found that the process of this invention results in a greater pulp yield for the same raw pulp quality. Moreover, various processing advatnages are obtained, e.g. less steam is required to reach and maintain the desired temperature of pulping and such temperature may be reached in a shorter period of time, e.g. as low as 5 minutes, lower vessel pressures and amounts of total $SO_2$ are required to achieve the desired degree of pulping, the treatment of the liquor by concentration or fortification for reuse in the process is more economical, and the liquor may be prepared and stored at atmospheric pressure. Moreover, there is no necessity for periodically removing some of the liquor from the digester because of an increase in volume due to steam condensation, nor is it necessary to relieve gas pressure from the digester during progress of the cook. Finally, the process may be readily adapted to continuous pulping methods with great ease and flexibility.

A specific preferred process under the invention comprises the following steps:

(1) Conversion of wood to suitably divided form, e.g. chips, wafers or subdivided chips.

(2) Delivery of the wood chips or other wood form to a pressure vessel either batchwise or by means of continuously operated equipment.

(3) Contacting the wood with steam at about 100–115° C. for 15–40 minutes, while continuously draining condensate from the bottom of the pressure vessel.

(4) Addition of magnesium bisulfite solution containing 3.5–10.0% by weight magnesium sulfite with a pH of 3.5–4.5 and temperature of 85 to 95° C. to the digester or the part of the digester containing the wood.

(5) Application of pressure to about 80–110 p.s.i.g. for about 15–35 minutes while maintaining the temperature at 80–95° C.

(6) Relief of pressure to atmospheric.

(7) Drainage or blowing of all free liquor from contact with the wood and its removal from the digester.

(8) Heating by direct steam or otherwise to a temperature of 160–180° C. in 5–30 minutes.

(9) Maintaining the wood wet with cooking liquor in the temperature range of 160–180° C. for 60–240 minutes, preferably 166–180° C. for 60 to 180 minutes, to yield an easily bleachable raw stock.

(10) Removing the cooked wood and accompanying liquor from the digester with the usual precautions to relieve pressure.

It has been found that when the process has been carried out with this sequence of steps, particularly good results in pulp yield, quality of pulp and economy of steam are obtained. Moreover, this particular type of process has several specific advantages over conventional sulfite processes, e.g. it is useful for a wide variety of wood including those yielding poor pulps with conventional sulfite proceses including the genera Pinus and Larix, *Psuedotsuga taxifolia* and many hardwoods. The process also results in little or no "burning" or degradation of pulp, has more bark tolerance and is adaptable to a wide diversity of cooking degree for different products, i.e. for semi-chemical to high-purity pulps. Moreover, the pulp yields obtained with this type of process are better than with conventional sulfite pulping and the quality of the pulp is superior in that it is stronger, has higher brightness and is capable of being bleached to very high brightness, e.g. by a three-stage bleach.

The following specific examples further illustrate the invention.

EXAMPLES I TO V

These examples illustrate variations in wood mixture, amount of combined $SO_2$ and type of heating, i.e. direct or indirect.

Wood chips were steamed for 30 minutes at 0 to 10 p.s.i.g. and 100 to 110° C. while continuously draining condensate from the bottom of the vessel. The chips were then contacted with cooking liquor having a pH of 3.5 and containing various concentrations of magnesium bisulfite at 90° C. and 90 p.s.i.g. for 30 minutes after which the liquor was completely drained from the digester. The mass containing residual liquor was then heated to a maximum of 166° C. in 30 minutes and kept at this temperature for 3 hours. Heating was carried out by direct steam in Examples I to III and V; in Example IV the mass was heated to the maximum by direct steam and kept at the maximum by indirect heating, i.e. by circulating condensate liquors formed while heating to the maximum temperature and heating said circulating liquor with steam in an external heat exchanger. The wood in Examples I to IV was 49% Western hemlock, 10% Engelmann spruce, 18% alpine fir (balsam), 6% Western larch, 5% Western white pine, 7% Douglas fir and 5% Western red cedar, and in Example V was composed of 50% Western hemlock, 25% sitka spruce and 25% amabilis fir (balsam). The concentration of liquor in each example and the results obtained are shown in Table 1:

*Table 1*

| Example | Comb. $SO_2$, percent | Total $SO_2$, percent | Screened yield, percent | Viscosity, cp. | K. number | Alpha cellulose, percent | Beta cellulose, percent | Gamma cellulose, percent | Alc.-benz. sol., percent | Pentosans, percent | Brightness G.E. |
|---|---|---|---|---|---|---|---|---|---|---|---|
| I | 3.50 | 7.04 | 42.7 | 534 | 29.8 | 89.7 | .02 | 10.3 | .20 | | 45.4 |
| II | 4.25 | 8.30 | 46.3 | 653 | 28.7 | 88.4 | .02 | 11.6 | .15 | 3.1 | 49.6 |
| III | 5.20 | 10.32 | 53.4 | 402 | 25.3 | 87.6 | .02 | 12.4 | .18 | 3.6 | 45.1 |
| IV | 5.03 | 9.94 | 51.1 | 306 | 26.2 | 86.8 | .02 | 13.2 | .15 | | 48.9 |
| V | 5.12 | 10.02 | 46.4 | 495 | 20.3 | 88.6 | .01 | 11.4 | .30 | 2.9 | 61.1 |

NOTE.—K. number—Permanganate number, a measure of residual lignin. Alc.-Benc. sol—Alcohol and benzene solubles, a measure of residual resin. G.E.—Brightness or whiteness measured on the General Electric meter.

EXAMPLES VI TO X

In these examples the same procedure was followed as in Examples I, II and V, except that times for steaming and impregnation and time taken to heat the mass to maximum temperature were varied as was the maximum temperature. The wood in Examples VI and VII was as in Examples I to IV, while in Examples VIII to X the wood was that used for Example V. The conditions and results of these examples are shown in Table 2:

*Table 2*

| Example | Time, hr.-min. | | | | | Max. temp., ° C. | Comb. $SO_2$, percent | Total $SO_2$, percent | Screened yield, percent | Viscosity, cp. | K. number | Alpha cellulose, percent (uncorr.) | Alc. benz., sol., percent | Brightness, G.E. |
|---|---|---|---|---|---|---|---|---|---|---|---|---|---|---|
| | Steaming | Impreg. | To max. temp. | At max. temp. | Total | | | | | | | | | |
| VI | 0'30" | 0'30" | 0'15" | 3'00" | 4'15" | 166 | 5.05 | 10.30 | 48.3 | 335 | 20.3 | 88.1 | .29 | 53.3 |
| VII | 0'30" | 0'30" | 0'05" | 3'00" | 4'05" | 166 | 5.10 | 10.06 | 42.7 | 597 | 29.6 | 87.9 | .20 | 50.8 |
| VIII | 0'15" | 0'15" | 0'30" | 3'00" | 4'00" | 166 | 5.00 | 10.30 | 50.7 | 357 | 22.7 | 88.6 | .33 | 52.0 |
| IX | 0'30" | 0'30" | 0'30" | 2'30" | 4'00" | 180 | 5.00 | 10.00 | 47.3 | 244 | 20.2 | 88.6 | .25 | 51.1 |
| X | 0'15" | 0'15" | 0'15" | 1'00" | 1'45" | 180 | 5.00 | 10.00 | 51.6 | 514 | 21.8 | 88.3 | .27 | 60.3 |

EXAMPLES XI TO XIII

In these examples the same technique was followed as in Examples I to III and V, except that the pH and hence the ratio of free to combined $SO_2$ of the impregnation liquor was varied. The wood in these examples was the same as that used in Examples V and VIII to X. The conditions and results of these examples are shown in Table 3.

*Table 3*

| Example | pH of impreg. liquor | Comb. $SO_2$, percent | Total $SO_2$, percent | Time at max. temp., hr.-min. | Screened yield, percent | Viscosity, cp. | K. number | Alpha cellulose (uncorr.), percent | Alc.-benz., sol., percent | Brightness, G.E. |
|---|---|---|---|---|---|---|---|---|---|---|
| XI | 1.5 | 5.00 | 13.84 | 2'30" | 42.2 | 321 | 13.1 | 87.9 | .35 | 56.4 |
| XII | 2.5 | 5.02 | 10.94 | 2'45" | 49.6 | 373 | 19.5 | 87.3 | .33 | 53.1 |
| XIII | 4.5 | 5.00 | 9.23 | 3'15" | 50.6 | 485 | 29.0 | 88.0 | .24 | 49.2 |

It can be seen from the results of the examples that high yields of pulp having good brightness and viscosity properties can be obtained by means of the process of this invention. Moreover, the relatively low content of beta cellulose in the pulp indicates that a minimum of cellulose degradation takes place. These benefits are accompanied by process advantages obtained through low consumption of steam and the relatively high concentration of liquor from the digester.

The pulp obtained by means of the process of this invention is useful in a wide variety of applications, e.g. production of paper, regenerated cellulose and cellulose derivatives.

It is to be understood that the foregoing detailed description is given merely by way of illustration and that many variations may be made therein without departing from the spirit of our invention.

Having described our invention what we desire to secure by Letters Patent is:

1. A process for the production of wood pulp which comprises contacting divided wood with an aqueous cooking liquor containing an inorganic bisulfite and having a combined sulfur dioxide content of at least 3.5%, a pH no greater than 4.5, and a ratio of total to combined sulfur dioxide no greater than 2.8 to 1, at a temperature and for a period of time sufficient to effect the impregnation of the liquor into the interstices of the wood, separating the free liquor from the wood after impregnation such that only residual liquor surrounds the pieces of wood, but there is substantially no liquor in the spaces between said pieces, and raising the wood to and maintaining it at cooking temperatures for a period sufficient to complete the cook.

2. A process for the production of wood pulp which comprises contacting divided wood with an aqueous cooking liquor containing magnesium bisulfite and having a combined sulfur dioxide content of at least 3.5%, a pH no greater than 4.5, and a ratio of total to combined sulfur dioxide no greater than 2.8 to 1, at a temperature and for a period of time sufficient to effect the impregnation of the liquor, separating the free liquor from the wood after impregnation such that only residual liquor surrounds the pieces of wood, but there is substantially no liquor in the spaces between said pieces, and maintaining the wood at cooking temperatures for a period sufficient to complete the cook.

3. A process for the production of wood pulp which comprises contacting divided wood with an aqueous cooking liquor containing an inorganic bisulfite and having a combined sulfur dioxide content of at least 3.5%, a pH of 3.5 to 4.5 and a ratio of total to combined sulfur dioxide no greater than 2.8 to 1, at a temperature and for a period of time sufficient to effect the impregnation of the liquor into the interstices of the wood, separating the free liquor from the wood after impregnation such that only residual liquor surrounds the pieces of wood, but there is substantially no liquor in the spaces between said pieces and maintaining the wood at cooking temperatures in the range of 160 to 180° C. by direct contact with steam from a period sufficient to complete the cook.

4. A process of manufacturing wood pulp comprising contacting clean divided wood with steam, contacting said steamed wood with an aqueous cooking liquor containing an inorganic bisulfite and having a combined sulfur dioxide content of at least 3.5%, a pH no greater than 4.5 and a ratio of total to combined sulfur dioxide no greater than 2.8 to 1, at a temperature and for a period of time sufficient to effect impregnation of the liquor into the interstices of the wood, separating the free liquor from the wood after impregnation such that residual liquor surrounds the pieces of wood but there is substantially no liquor in the spaces between said pieces and maintaining the wood at cooking temperatures for a period sufficient to complete the cook.

5. A process of manufacturing wood pulp comprising contacting clean divided wood with steam, contacting said steamed wood with an aqueous cooking liquor containing magnesium bisulfite and having a combined sulfur dioxide content of at least 3.5%, a pH no greater than 4.5 and a ratio of total to combined sulfur dioxide no greater than 2.8 to 1, at a temperature and for a period of time to effect impregnation of the liquor into the interstices of the wood, separating the free liquor from the wood after impregnation such that residual liquor surrounds the pieces of wood but there is substantially no liquor in the spaces between said pieces, and maintaining the wood at cooking temperatures for a period sufficient to complete the cook.

6. A process of manufacturing wood pulp comprising contacting clean divided wood with steam, contacting said steamed wood with an aqueous cooking liquor containing an inorganic bisulfite and having a combined sulfur dioxide content of at least 3.5%, a pH no greater than 4.5 and ratio of total to combined sulfur dioxide no greater than 2.8 to 1, at a temperature and for a period of time to effect impregnation of the liquor into the interstices of the wood, separating the free liquor from the wood after impregnation such that residual liquor surrounds the pieces of wood but there is substantially no liquor in the spaces between said pieces, and maintaining the wood at cooking temperatures by direct contact with steam for a period sufficient to complete the cook.

7. A process of manufacturing wood pulp comprising contacting clean divided wood with steam, contacting said steamed wood with an aqueous cooking liquor containing an inorganic bisulfite and having a combined sulfur dioxide content of at least 3.5%, a pH no greater than 4.5 and a ratio of total to combine sulfur dioxide no greater than 2.8 to 1, at elevated temperature and pressure and for a period of time to effect impregnation of the liquor into the interstices of the wood, relieving the pressure to atmospheric, separating the free liquor from the wood after impregnation such that residual liquor surrounds the pieces of wood but there is substantially no liquor in the spaces between said pieces, heating the wood to a cooking temperature higher than said impregnation temperature and maintaining the wood at said cooking temperature for a period sufficient to complete the cook.

8. A process of manufacturing wood pulp comprising contacting clean divided wood with steam, contacting said steamed wood with an aqueous cooking liquor containing magnesium bisulfite and having a combined sulfur dioxide content of at least 3.5%, a pH of 3.5 to 4.5 and a ratio of total to combined sulfur dioxide no greater than 2.8 to 1, at elevated temperature and pressure for about 15–35 minutes to effect impregnation of the liquor into the interstices of the wood, relieving the pressure to atmospheric, separating the free liquor from the wood after impregnation such that residual liquor surrounds the pieces of wood but there is substantially no liquor in the spaces between said pieces, heating the wood by direct contact with steam to a cooking temperature higher than said impregnation temperature and in the range of 160 to 180° C. and mantaing the wood at said cooking temperature by direct contact with steam for 60–240 minutes to complete the cook.

9. A process of manufacturing wood pulp comprising contacting clean divided wood with steam at about 100–115° C., for 15–40 minutes contacting said steamed wood with an aqueous cooking liquor containing 3.5 to 10.0% by weight of sulfur dioxide as magnesium bisulfite and having a pH of 3.5 to 4.5, and temperature of 80–95° C. at a pressure of 80–110 p.s.i.g. for about 15–35 minutes, relieving the pressure to atmospheric, separating the free liquor from the wood such that residual liquor surrounds the pieces of wood but there is substantially no liquor in the spaces between said pieces, heating the wood by direct contact with steam to a temperature of 160–180° C. in 5–30 minutes, maintaining the wood wet with cooking liquor at a temperature of 160–180° C., by direct contact with steam for 60–240 minutes, and separating the cooked wood from the residual liquor.

References Cited in the file of this patent

UNITED STATES PATENTS 2,640,774  Ross _____ June 2, 1953

OTHER REFERENCES

Casey: Pulp and Paper, vol. I, pub. by Interscience Pub., New York, N.Y., 1952, pages 84 and 99–101.